United States Patent
Peterson et al.

(10) Patent No.: US 9,364,018 B1
(45) Date of Patent: Jun. 14, 2016

(54) ADSORBENT PARTICLE SIZING FOR GAS DISSOLUTION IN BEVERAGES

(71) Applicant: Keurig Green Mountain, Inc., Waterbury, VT (US)

(72) Inventors: Peter Peterson, Waterbury, VT (US); Jennifer Caitlin Huot Carlson, Essex Junction, VT (US)

(73) Assignee: Keurig Green Mountain, Inc., Waterbury, VT (US)

( * ) Notice: Subject to any disclaimer, the term of this patent is extended or adjusted under 35 U.S.C. 154(b) by 0 days.

(21) Appl. No.: 14/619,344

(22) Filed: Feb. 11, 2015

(51) Int. Cl.
*B65D 81/32* (2006.01)
*A23L 2/54* (2006.01)
*F17C 11/00* (2006.01)
*B65D 85/804* (2006.01)

(52) U.S. Cl.
CPC . *A23L 2/54* (2013.01); *B65D 81/32* (2013.01); *B65D 85/8043* (2013.01); *F17C 11/00* (2013.01); *A23V 2002/00* (2013.01); *F17C 2221/013* (2013.01)

(58) Field of Classification Search
CPC ........... B65D 85/8043; B65D 85/8046; B65D 81/32; B01J 20/165; B01J 20/18; F17C 2221/013; A23V 2002/00
USPC .................. 426/77, 78, 79, 80, 81, 82, 83, 84
See application file for complete search history.

(56) References Cited

U.S. PATENT DOCUMENTS

| | | |
|---|---|---|
| 716,474 A | 12/1902 | Price |
| 1,945,489 A | 1/1934 | Manley |
| 2,072,350 A | 3/1937 | Welker |
| 2,201,430 A | 5/1940 | Deibel |
| 2,219,032 A | 10/1940 | Kantor |
| 3,628,444 A | 12/1971 | Mazza |
| 3,851,797 A | 12/1974 | Jacobs |
| 3,888,998 A * | 6/1975 | Sampson et al. ................. 426/67 |
| 3,930,053 A | 12/1975 | Japiske et al. |
| 4,007,134 A | 2/1977 | Liepa et al. |

(Continued)

FOREIGN PATENT DOCUMENTS

| | | |
|---|---|---|
| DE | 102007001609 A1 | 7/2008 |
| GB | 1051012 | 12/1966 |

(Continued)

OTHER PUBLICATIONS

"Mesh to Micron Conversion Chart." Oct. 22, 2007. <http://www.showmegold.org/news/Mesh.htm> Accessed May 1, 2015.*

(Continued)

*Primary Examiner* — Erik Kashnikow
*Assistant Examiner* — Ericson M Lachica
(74) *Attorney, Agent, or Firm* — Wolf, Greenfield & Sacks, P.C.

(57) ABSTRACT

Systems, methods and cartridges for carbonating or otherwise dissolving gas in a precursor liquid, such as water, to form a beverage. A gas source can be provided in a cartridge which is used to generate gas that is dissolved into the precursor liquid. A beverage medium, such as a powdered drink mix or liquid syrup, may be provided in the same, or a separate cartridge as the gas source and mixed with the precursor liquid to form a beverage. The gas source may include a solid molecular sieve formed in beads in which at least 85% of the beads by weight have a size of 0.71 mm to 2.0 mm.

19 Claims, 5 Drawing Sheets

(56) References Cited

U.S. PATENT DOCUMENTS

| | | | |
|---|---|---|---|
| 4,011,733 A | 3/1977 | Kuckens et al. | |
| 4,025,655 A | 5/1977 | Whyte et al. | |
| 4,040,342 A | 8/1977 | Austin et al. | |
| 4,110,255 A | 8/1978 | Liepa et al. | |
| 4,147,808 A * | 4/1979 | Liepa et al. | 426/477 |
| 4,186,215 A | 1/1980 | Buchel | |
| 4,214,011 A * | 7/1980 | Strube | 426/591 |
| 4,316,409 A | 2/1982 | Adams et al. | |
| 4,458,584 A | 7/1984 | Annese et al. | |
| 4,475,448 A | 10/1984 | Shoaf et al. | |
| 4,493,441 A | 1/1985 | Sedam | |
| 4,636,337 A | 1/1987 | Guptal et al. | |
| 4,804,112 A | 2/1989 | Jeans | |
| 4,839,107 A | 6/1989 | Rudick et al. | |
| 4,927,567 A | 5/1990 | Rudick | |
| 5,021,219 A | 6/1991 | Rudick et al. | |
| 5,073,312 A | 12/1991 | Burrows | |
| 5,102,627 A | 4/1992 | Plester | |
| 5,115,956 A | 5/1992 | Kirschner et al. | |
| 5,160,461 A | 11/1992 | Burrows | |
| 5,182,084 A | 1/1993 | Plester | |
| 5,192,513 A | 3/1993 | Stumphauzer et al. | |
| 5,312,017 A | 5/1994 | Schroeder et al. | |
| 5,350,587 A | 9/1994 | Plester | |
| 5,510,060 A | 4/1996 | Knoll | |
| 5,553,749 A | 9/1996 | Oyler et al. | |
| 5,565,149 A | 10/1996 | Page et al. | |
| 5,611,937 A | 3/1997 | Jarocki | |
| 5,992,685 A | 11/1999 | Credle, Jr. | |
| 6,138,995 A | 10/2000 | Page | |
| 6,182,949 B1 | 2/2001 | Mobbs | |
| 6,253,960 B1 | 7/2001 | Bilskie et al. | |
| 6,324,850 B1 | 12/2001 | Davis | |
| 6,712,342 B2 | 3/2004 | Bosko | |
| 7,094,434 B2 | 8/2006 | Gaonkar et al. | |
| 7,114,707 B2 | 10/2006 | Rona et al. | |
| 7,267,247 B1 | 9/2007 | Crunkleton, III et al. | |
| 7,288,276 B2 | 10/2007 | Rona et al. | |
| 7,407,154 B2 | 8/2008 | Sakakibara et al. | |
| 7,838,056 B2 * | 11/2010 | Forgac et al. | 426/474 |
| 2003/0188540 A1 | 10/2003 | Van Winkle | |
| 2004/0134932 A1 | 7/2004 | Lobdell | |
| 2005/0029287 A1 | 2/2005 | Mobbs | |
| 2006/0000851 A1 | 1/2006 | Girard | |
| 2008/0148948 A1 | 6/2008 | Evers | |
| 2009/0282987 A1 | 11/2009 | MacMahon et al. | |
| 2009/0311384 A1 | 12/2009 | MacMahon et al. | |
| 2010/0133708 A1 | 6/2010 | Fischer et al. | |
| 2010/0139496 A1 | 6/2010 | Santoiemmo | |
| 2010/0251901 A1 | 10/2010 | Santoiemmo | |
| 2011/0020508 A1 | 1/2011 | Santoiemmo | |
| 2011/0226343 A1 * | 9/2011 | Novak et al. | 137/12.5 |
| 2013/0129870 A1 | 5/2013 | Novak et al. | |

FOREIGN PATENT DOCUMENTS

| | | |
|---|---|---|
| GB | 1143742 | 2/1969 |
| GB | 2038953 A | 7/1980 |
| GB | 2076628 | 12/1981 |
| GB | 2234187 | 1/1991 |
| JP | 53-091181 | 8/1978 |
| JP | 2003231592 | 8/2003 |
| WO | WO 2008/115047 A1 | 9/2008 |
| WO | WO 2008/124851 A1 | 10/2008 |

OTHER PUBLICATIONS

Annex dated May 11, 2011, International Application No. PCT/US2011/023157.

Invitation to Pay Additional Fees from the International Searching Authority for International Application No. PCT/US2012/049356, Mailed Nov. 27, 2012.

\* cited by examiner

ADSORBENT PARTICLE SIZING FOR GAS DISSOLUTION IN BEVERAGES

BACKGROUND

The inventions described herein relate to dissolving gas in liquids, e.g., carbonation, for use in preparing a beverage. Systems for carbonating liquids and/or mixing liquids with a beverage medium to form a beverage are described in a wide variety of publications, including U.S. Pat. Nos. 4,025,655; 4,040,342; 4,636,337; 6,712,342 and 5,182,084; and PCT Publication WO 2008/124851.

SUMMARY OF INVENTION

Aspects of the invention relate to carbonating or otherwise dissolving a gas in a precursor liquid, such as water, to form a beverage. In some embodiments, a carbon dioxide or other gas source can be provided in a cartridge which is used to generate carbon dioxide or other gas that is dissolved into the precursor liquid. In some embodiments, a beverage medium, such as a powdered drink mix or liquid syrup, may be provided in the same, or a separate cartridge as the gas source and mixed with the precursor liquid (either before or after carbonation) to form a beverage. The use of one or more cartridges for the gas source and/or beverage medium may make for an easy to use and mess-free system for making carbonated or other sparkling beverages, e.g., in the consumer's home. (The term "carbonation" or "carbonated" is used herein to generically refer to beverages that have a dissolved gas, and thus refers to a sparkling beverage whether the dissolved gas is carbon dioxide, nitrogen, oxygen, air or other gas. Thus, aspects of the invention are not limited to forming beverages that have a dissolved carbon dioxide content, but rather may include any dissolved gas.)

The inventors have found that in some embodiments, appropriate sizing of a gas source material is important to achieve a desired release rate of gas from the gas source material. For example, molecular sieves, such as a zeolite, can be used to adsorb gas that is released when the molecular sieve is exposed to water. In general, molecular sieves tend to release adsorbed gas very quickly, e.g., within seconds or less of exposure to water. This rapid release can be problematic in some circumstances, and in general, is believed to be the reason why molecular sieves have not been used in commercially-available beverage carbonation devices. That is, the rapid release of gas from a molecular sieve can cause large pressure spikes to be experienced when the molecular sieve is contained in an enclosed, sealed chamber. Such large pressure spikes can cause damage to equipment and/or require that the pressure container be made very robust to withstand high pressures, increasing cost and complexity.

The inventors have also found that the pressure spike problem can be especially challenging when using a molecular sieve to provide carbonating gas in a consumer-type beverage machine, e.g., a machine that carbonates and dispenses a serving of sparkling beverage using a cartridge containing a carbonating gas source in the form of a molecular sieve. On one hand, the carbonating gas must be released relatively quickly, e.g., in under 2-5 minutes, so that a beverage can be made in a relatively timely fashion. On the other hand, rapid release of the gas, e.g., in less than 10 seconds, can cause high pressure spikes to be experienced. To balance these competing considerations, the inventors have found that sizing beads of a molecular sieve, e.g., made of a zeolite, in a relatively narrow range can assist in controlling gas release so as to achieve a suitably slow rate to avoid problematic pressure spikes as well as a suitably fast rate to allow a volume of liquid, e.g., 200-1000 ml, to be carbonated to a level of 1 to 5 volumes in 5 minutes or less. (A carbonation "volume" refers to the number of volume measures of carbon dioxide gas that is dissolved in a given volume measure of liquid. For example, a 1 liter amount of "2 volume" carbonated water includes a 1 liter volume of water that has 2 liters of carbon dioxide gas dissolved in it. Similarly, a 1 liter amount of "4 volume" carbonated water includes a 1 liter volume of water that has 4 liters of carbon dioxide dissolved in it. The gas volume measure is the gas volume that could be released from the carbonated liquid at atmospheric or ambient pressure and room temperature.)

In one aspect of the invention, a cartridge for use by a beverage forming machine in forming a beverage includes a container having a first chamber that is sealed and encloses a gas source material arranged to release a gas adsorbed in the gas source material with the addition of a fluid introduced into the first chamber. In some embodiments, the gas source material is a solid molecular sieve, such as a zeolite, formed in beads in which at least 85% of the beads by weight have a size of 0.71 mm to 2.0 mm. By providing a large majority of the zeolite beads in this size range, a gas release rate can be suitably controlled whether an amount of activating fluid provided to the beads is controlled or not. The container may be arranged to have an inlet through which fluid is introducible by the beverage forming machine into the first chamber to cause the gas source material to release the gas, and arranged to have an outlet through which gas released by the gas source exits the first chamber for dissolution in a beverage.

In some embodiments, less than 5% of the beads have a size over 2.0 mm. This threshold has been found in certain applications to ensure that adsorbed gas is released at a suitably fast rate. That is, activating fluid, such as water, takes longer to penetrate into larger beads, and therefore gas release from internal portions of the bead farthest from the bead surface may take a relatively long time to be exposed to the water and release gas in response. By having less than 5% of the beads to have a size over 2.0 mm, gas release has been found to be acceptably fast.

Moreover, less than 10% of the beads may have a size under 0.71 mm. In contrast to larger beads, smaller beads tend to release adsorbed gas more rapidly, e.g., because water penetrates into internal portions of the bead faster. Thus, beads under a certain size have been found to release adsorbed gas too quickly for some applications. By having less than 10% of the beads with a size under 0.71 mm, suitably slow gas release can be achieved, particularly in a cartridge-based application of a beverage machine.

Regarding the size of beads, a bead having a size less than 0.71 mm is one that passes through a US Mesh 25 screen, whereas a bead having a size between 0.71 mm and 2.0 mm does not pass through a US Mesh 25 screen but passes through a US Mesh 10 screen. A bead having a size greater than 2.0 mm does not pass through a US Mesh 10 screen. A "bead" as used herein refers to an object that may have a variety of different shapes, such as spherical, cylindrical, cuboid, capsule-shaped, and others. Also, in some embodiments, a bead has a ratio of a mass of adsorbed gas to a mass of the bead of at least 15%, and is arranged to release at least 95% of all adsorbed gas within 60 seconds when immersed in water. Thus, in these embodiments, a structure that does not have a ratio of adsorbed gas mass to bead mass of at least 15% and cannot release at least 95% of all adsorbed gas within 60 seconds of immersion in water is not a "bead." For example, in some arrangements, a cartridge may include filler elements, such as uncharged zeolite masses have a bead shape, in addition to charged zeolite beads, and the uncharged masses are not considered a "bead" since they have little or no adsorbed gas. Similarly, some zeolite particles in a cartridge may include a coating or otherwise are unable to release adsorbed gas within 60 seconds of water immersion, and thus are not considered "beads."

In some embodiments, the cartridge includes a mass of gas source material of 10-50 grams and a volume of less than 50 ml. Such amounts are suitable to carbonate a beverage, e.g., the 10-50 grams of gas source material may have an amount of adsorbed gas equivalent to a volume of 300 ml to 2000 ml of the gas at atmospheric pressure. This amount of gas may be suitable to carbonate a volume of water of 200-1000 ml to a level of about 1-5 volumes.

To release the adsorbed gas from the gas source material, the material may be exposed to a fluid, such as liquid water or water vapor. In some cases, the gas source material may be arranged to release the adsorbed gas upon the introduction of 20 ml to 40 ml of liquid water to the first chamber. The container in which the gas source material is contained may include a lid that is piercable by the beverage forming machine to form the inlet and outlet, i.e,. an inlet for activating water or other fluid and an outlet for gas released from the gas source material. In one embodiment, the top of the cartridge container may be piercable to form the inlet and outlet of the first chamber, a sidewall may extend downwardly from the top, and a rim may extend outwardly from a lower end of the sidewall. The rim may provide a clamping surface for a beverage machine to engage the cartridge to create a seal and help maintain gas released from the cartridge under suitable pressure in a closed chamber in which the cartridge is at least partially held. A filter may be included in the first chamber to resist exit of gas source material from the outlet of the first chamber. For example, in some cases, small particles of gas source material may tend to be carried by the flow of gas from the cartridge. The filter may help resist exit of the entrained particles, thereby helping to resist the particles from being carried to the precursor liquid to be carbonated.

In some embodiments, a cartridge container may also include a second chamber that is separated from the first chamber, with the second chamber being sealed and containing a beverage medium for mixing with a precursor liquid to form a beverage. For example, the beverage medium may be a syrup or other concentrate that is mixed with a beverage precursor in, or outside of, the cartridge. The second chamber may be located below the first chamber, and the first and second chambers may be separated by a wall. In one embodiment, the container may include a top, an upper sidewall that extends downwardly from the top, a bottom, a lower sidewall that extends upwardly from the bottom, and a rim that extends outwardly from a lower end of the upper sidewall and an upper end of the lower sidewall. The top may be piercable to form the inlet and outlet, the rim may be piercable (e.g., at an underside or lower surface of the rim) to form an inlet opening to the second chamber through which to receive pressurized gas into the second chamber, and the bottom may include an outlet opening through which beverage medium exits the second chamber, e.g., in response to pressurized gas forcing the beverage medium to exit.

Regarding the speed at which the gas source material releases gas, the first chamber and the gas source material may be arranged to cause the release of the gas adsorbed in the gas source material within 20 to 40 seconds upon introduction of 20 to 40 ml of liquid water into the first chamber. The gas released may be equivalent to a volume of 300 ml to 2000 ml of the gas at atmospheric pressure, and may be suitable for forming a carbonated beverage having a volume of between 100-1000 ml and a carbonation level of about 1 to 5 volumes over a time period of less than 60 seconds.

In another aspect of the invention, a method of forming a beverage includes providing a cartridge having a container with a first chamber that is sealed and encloses a gas source material arranged to release a gas adsorbed in the gas source material with the addition of a fluid introduced into the first chamber. The gas source material may be a solid molecular sieve and formed in beads in which at least 85% of the beads by weight have a size of 0.71 mm to 2.0 mm. For example, the gas source material may be a zeolite, and the gas may be carbon dioxide. Fluid, such as liquid water, may be introduced into the first chamber to cause the gas source material to release gas, and the released gas may be dissolved in a beverage.

Other features of the beads discussed above may be employed in the beverage production method, e.g., the beads may be arranged such that less than 5% of the beads have a size over 2.0 mm, less than 10% of the beads have a size under 0.71 mm, the beads may be arranged to release at least 95% of all adsorbed gas within 60 seconds when immersed in water, etc.

Precursor liquid used to form the beverage may be carbonated in the first cartridge portion, or in one or more other areas (such as a reservoir or membrane carbonator) to which gas is delivered such that the beverage does not contact the gas source material. Mixing of the precursor liquid with beverage medium may occur before or after carbonation, and may occur in a second cartridge portion or in another location, such as a mixing chamber separate from the second cartridge portion.

A beverage making system that uses a cartridge containing gas source material may include a gas source activating fluid supply arranged to provide fluid to the cartridge chamber for contact with the gas source to cause the gas source to emit gas. For example, the gas activating fluid supply may be arranged to control an amount of fluid (such as water in liquid or vapor form) provided to the cartridge chamber to control an amount of gas produced by the gas source. This may allow the system to control a gas pressure used to carbonate the precursor liquid. Thus, the cartridge chamber may be arranged to hold at least the first cartridge portion in the cartridge chamber under a pressure that is greater than an ambient pressure. Alternately, the first cartridge portion may be arranged to withstand a pressure caused by gas emitted by the gas source without a supporting structure or other enclosure. A gas supply may be arranged to conduct gas emitted by the gas source, under pressure greater than the ambient pressure, to beverage precursor liquid to carbonate the precursor liquid. The gas may be conducted to a carbonation tank, a membrane contactor, or other suitable arrangement for carbonation.

In some embodiments, the first and second cartridge chambers may each be part of respective first and second cartridges that are distinct from each other, or the cartridge chambers may be part of a single cartridge. If part of a single cartridge, the first and second cartridge chambers may be separated from each other, e.g., by a permeable element such as a filter, or an impermeable element such as a wall of the cartridge that may or may not be frangible, burstable (such as by suitable pressure), piercable or otherwise breached to allow the first and second cartridge chambers to communicate with each other. A cartridge associated with the first and second cartridge chambers may be pierced or otherwise arranged for fluid communication while in a cartridge holder of a beverage machine to allow access to the first and second chambers. For example, the two cartridge portions may be pierced by closing of the cartridge holder to allow fluid to be provided to and/or gas to exit from the first cartridge chamber, and to allow the beverage medium to exit the second cartridge chamber whether alone or with a mixed precursor liquid.

In some embodiments, the first and cartridge chambers may each have a volume that is less than a volume of carbonated beverage to be formed using the cartridge chambers. This can provide a significant advantage by allowing a user to form a relatively large volume beverage using a relative small volume cartridge or cartridges. For example, the system may be arranged to use the first and second cartridge chambers over a period of time less than about 120 seconds to form a carbonated liquid having a volume of between 100-1000 ml and a carbonation level of about 1 to 5 volumes. Carbonation may occur at pressures between 20-80 psi, or more. The cartridge portions in this embodiment may have a volume of about 50 ml or less, reducing an amount of waste and/or adding to convenience of the system.

These and other aspects of the invention will be apparent from the following description and claims.

BRIEF DESCRIPTION OF THE DRAWINGS

Aspects of the invention are described with reference to the following drawings in which like numerals reference like elements, and wherein.

DETAILED DESCRIPTION

It should be understood that aspects of the invention are described herein with reference to the figures, which show illustrative embodiments. The illustrative embodiments described herein are not necessarily intended to show all embodiments in accordance with the invention, but rather are used to describe a few illustrative embodiments. For example, aspects of the invention are described with reference to a specific cartridge embodiment, but aspects of the invention are not limited to the cartridge arrangements described herein. Thus, aspects of the invention are not intended to be construed narrowly in view of the illustrative embodiments. In addition, it should be understood that aspects of the invention may be used alone or in any suitable combination with other aspects of the invention.

Figure 1:
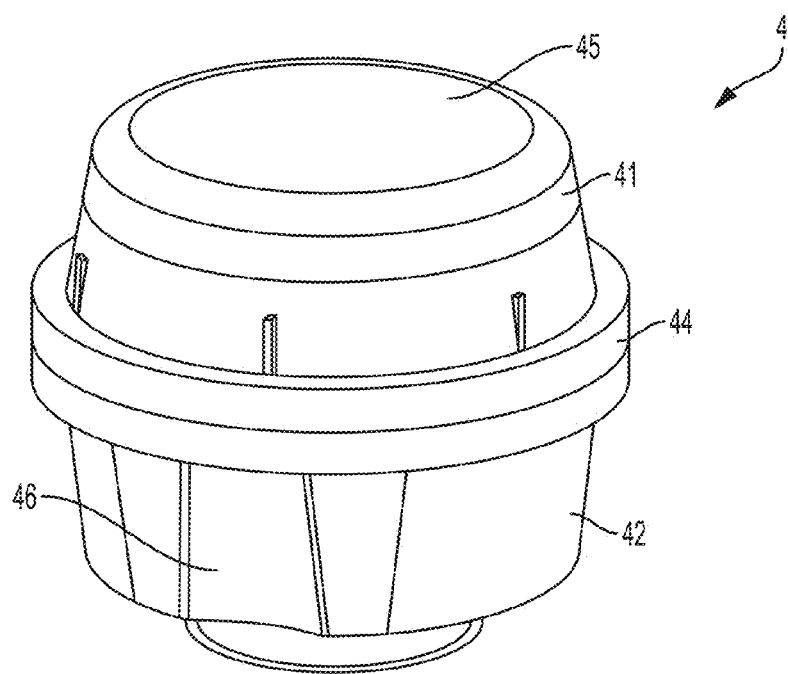
FIG. 1 shows a perspective view of a cartridge in an illustrative embodiment.
Figure 2:
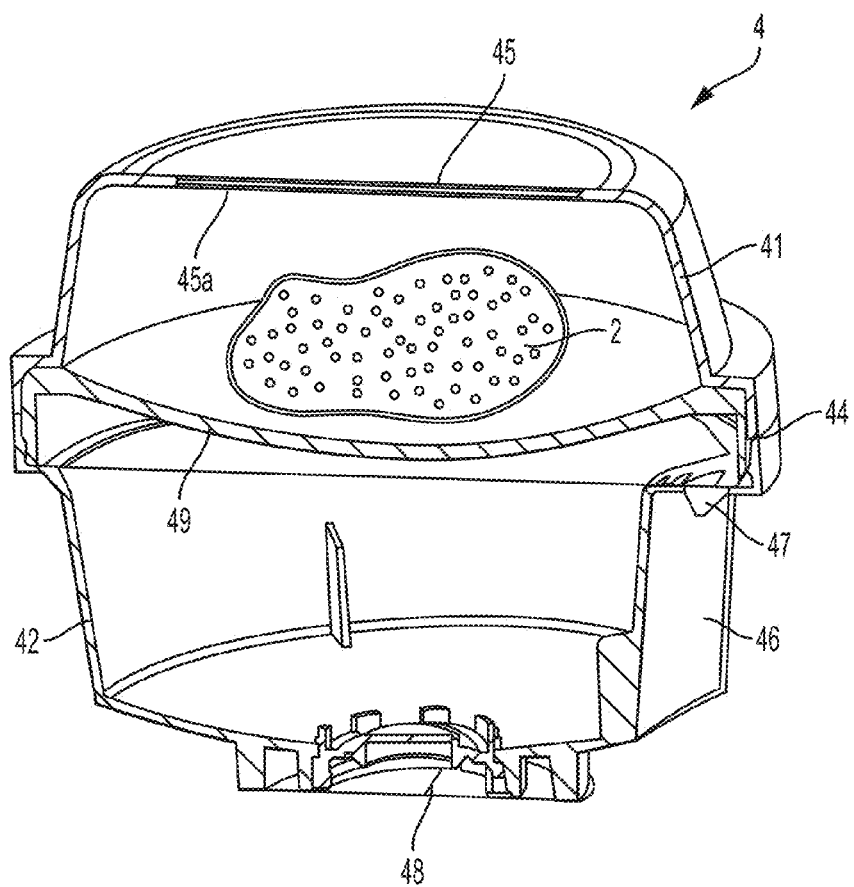
FIG. 2 shows a cross sectional view of the FIG. 1 cartridge.

While alternative cartridge configurations are possible, FIGS. 1 and 2 show a cartridge 4 that may be used with a beverage making system that employs the cartridge to at least carbonate a beverage precursor liquid to form a beverage. In this embodiment, the cartridge 4 includes a container that defines an upper compartment or chamber 41, a lower compartment or chamber 42, and a rim or band 44 between a top and bottom of the cartridge 4. The top of the cartridge 4 includes a lid 45 that covers an opening of the container. The lid 45 is piercable to form one or more openings so as to access a gas source 2 (see FIG. 2) in the upper compartment 41. (Although in this embodiment, the lid 45 is a separate element, such as a sheet of foil/polymer laminate attached to the container body, the lid may be molded or otherwise formed integrally with the body.) Also, a filter 45a may be positioned below the lid 45, e.g., spaced apart from the lid 45 but parallel to the lid 45, although other arrangements are possible. This filter 45a may help prevent gas source material from exiting the upper compartment 41 during gas production. The upper compartment 41 is also defined in part by a wall 49 that has a concave up curve, but such a shape is not necessary, e.g., the wall 49 may be flat or concave down.

Figure 3:
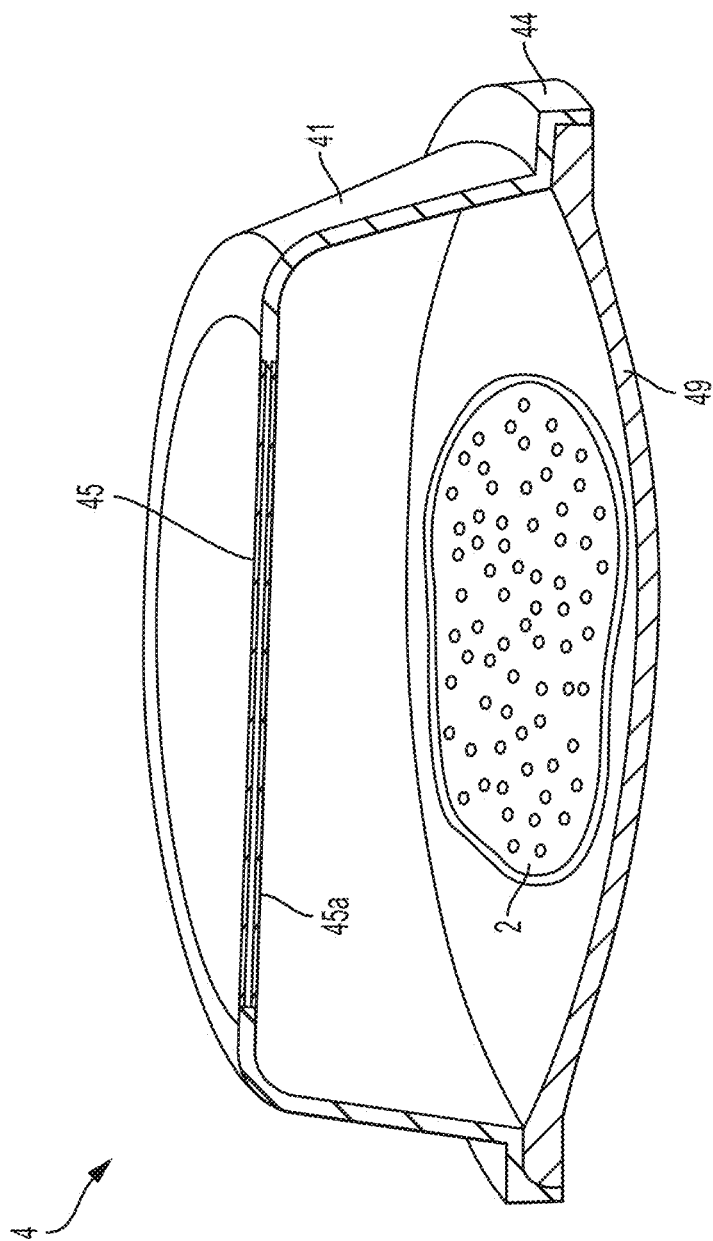
FIG. 3 shows a cross sectional view of a modified version of the FIG. 1 cartridge having only a gas source chamber.

The lower compartment or chamber 42 contains a beverage medium (not shown for clarity) that can be mixed with a precursor liquid to form a beverage. A piercable inlet 47 may be located at an underside of the rim 44 and adjacent an indexing groove 46 formed in the lower sidewall of the cartridge 4. As is discussed in more detail below, the inlet 47 may be pierced to allow access to the lower compartment 42, e.g., so pressurized gas or liquid can be introduced into the lower compartment 42 to move the beverage medium out of an outlet 48 of the lower compartment 42. In this embodiment, the outlet 48 includes a piercable membrane that can be pierced and opened to allow the beverage medium to exit, although other arrangements are possible, e.g., a self-closing septum valve or burstable seal may be provided at the outlet 48 that opens with increased pressure in the lower compartment 48. Cartridges are not limited to the arrangement shown in FIGS. 1 and 2, however, and other cartridge configurations, such as those that include only a gas source (e.g., only a rim 44 and upper compartment 41 like that shown in FIG. 3) to make a carbonated water, are possible. In the case of FIG. 3, the wall 49 forms a bottom of the cartridge container from which the rim 44 extends outwardly. The wall 49, as noted above, may be flat, or otherwise shaped and need not have the shape shown.

In accordance with an aspect of the invention, the cartridge 4 contains a gas source material 2 in the form of a plurality of beads of a molecular sieve. The gas source material 2 is a charged adsorbent or molecular sieve, e.g., a zeolite material that has adsorbed an amount of carbon dioxide gas that is released in the presence of water or other activating fluid, whether in vapor or liquid form. Note, however, that aspects of the invention are not necessarily limited to use with carbon dioxide gas, but may be used with any suitable gas, such as nitrogen, which is dissolved in some beers or other beverages, oxygen, air, and others. Thus, reference to "carbonation", "carbon dioxide source" "carbon dioxide activating fluid supply", etc., should not be interpreted as limiting aspects of the invention and/or any embodiments to use with carbon dioxide only. Instead, aspects of the invention may be used with any suitable gas.

In one embodiment, the charged adsorbent is a zeolite such as analcime, chabazite, clinoptilolite, heulandite, natrolite, phillipsite, or stilbite along with a suitable binder or filler component, e.g., to help form the zeolite into a desired shape. The zeolite may be naturally occurring or synthetic, and may be capable of holding up to about 20% carbon dioxide by weight or more. The zeolite material may be arranged in any suitable form, such as a solid block (e.g., in disc form), particles of spherical, cubic, irregular or other suitable shape, and others. In one aspect of the invention, the molecular sieve is arranged in the form of beads that have a size of 0.71 mm to 2.0 mm. One particularly effective arrangement includes beads of solid molecular sieve material in a cartridge such that at least 85% of the beads by weight have a size of 0.71 mm to 2.0 mm. In some embodiments, less than 5% of the beads have a size over 2.0 mm, which has been found in certain applications to ensure that adsorbed gas is released as a suitably fast rate. That is, activating fluid, such as water, takes longer to penetrate into larger beads, and smaller bead sizes tend to release gas more quickly when exposed to moisture. Thus, having a suitably small size of the beads may tend to cause quicker release of adsorbed gas. Moreover, less than 10% of the beads may have a size under 0.71 mm. In contrast to larger beads, smaller beads tend to release adsorbed gas more rapidly, so beads under a certain size have been found to release adsorbed gas too quickly for some applications. By having less than 10% of the beads with a size under 0.71 mm, suitably slow gas release can be achieved, particularly in a cartridge-based application for use with a beverage machine. In this particular embodiment, a 50 gram or less mass of molecular sieve beads has been found to release 95% of adsorbed gas or more within 20-40 seconds after being exposed to 20-40 ml of liquid water. This release rate is suitably slow to help prevent high pressure spikes while being suitable fast to allow for the carbonation and dispensing of a beverage in less than 5 minutes.

Regarding the size of beads, a bead having a size less than 0.71 mm is one that passes through a US Mesh 25 screen, whereas a bead having a size between 0.71 mm and 2.0 mm does not pass through a US Mesh 25 screen but passes through a US Mesh 10 screen. A bead having a size greater than 2.0 mm does not pass through a US Mesh 10 screen.

Another advantage of having zeolites or other molecular sieves in a bead configuration is that it allows the zeolite to flow or be flowable, e.g., spherical particles, may be useful for packaging the zeolite in individual cartridges. Such an arrangement may allow the zeolite to flow from a hopper into a cartridge container, for example, simplifying the manufacturing process.

The cartridge 4 container may be made of any suitable materials, and is not necessarily limited to the constructions shown herein. For example, the cartridge may be made of, or otherwise include, materials that provide a barrier to moisture and/or gases, such as oxygen, water vapor, etc. In one embodiment, the cartridge may be made of a molded polymer or polymer laminate, e.g., formed from a sheet including a layer of polystyrene, polypropylene and/or a layer of EVOH and/or other barrier material, such as a metallic foil. Moreover, the cartridge materials and/or construction may vary according to the materials contained in the cartridge. For example, a portion of the cartridge 4 containing a gas source material may require a robust moisture barrier, whereas a beverage medium portion may not require such a high moisture resistance. Thus, the cartridges may be made of different materials and/or in different ways. In addition, the cartridge interior may be differently constructed according to a desired function. For example, where beverage medium is mixed with precursor liquid in the cartridge, a beverage medium cartridge portion may include baffles or other structures that cause the liquid/beverage medium to follow a tortuous path so as to encourage mixing. The gas source cartridge portion may be arranged to hold the gas source in a particular location or other arrangement in the interior space, e.g., to help control wetting of the gas source with activating liquid. Thus, as used herein, a "cartridge" may take any suitable form, such as a pod (e.g., opposed layers of filter paper encapsulating a material), capsule, sachet, package, or any other arrangement. The cartridge may have a defined shape, or may have no defined shape (as is the case with some sachets or other packages made entirely of flexible material). The cartridge may be impervious to air and/or liquid, or may allow water and/or air to pass into the cartridge.

A cartridge may also be arranged to provide a visual or other detectable indication regarding the cartridge's fitness for use in forming a beverage. For example, the cartridge may include a pop-up indicator, color indicator or other feature to show that the gas source has been at least partially activated. Upon viewing this indication, a user may determine that the cartridge is not fit for use in a beverage making machine. In another embodiment, an RFID tag may be associated with a sensor that detects gas source activation (e.g., via pressure increase), beverage medium spoilage (e.g., via temperature increase), or other characteristic of the cartridge, which may be transmitted to a reader of a beverage making machine. The machine may display the condition to a user and/or prevent activation of the machine to use the cartridge to form a beverage.

In one aspect of the invention, the cartridge or cartridges used to form a beverage using the beverage making system may have a volume that is less, and in some cases substantially less, than a beverage to be made using the cartridge(s). For example, a cartridge may have upper and lower compartments 41, 42 that each have a volume that is about 50 ml or less, and yet can be used to form a beverage having a volume of about 200-500 ml or more. In some embodiments, an amount of charged adsorbent (e.g., a charged zeolite) of about 10-50 grams (which has a volume of less than 50 ml) can be used to produce about 300-1000 ml of carbonated water having a carbonation level of up to about 4-5 volumes. Moreover, it is well known that beverage-making syrups or powders having a volume of less than about 50 ml, or less than about 100 ml, can be used to make a suitably flavored beverage having a volume of about 300-500 ml. Thus, relatively small volume cartridges (or a single cartridge in some arrangements) having a volume of about 100 ml to about 250 ml or less may be used to form a carbonated beverage having a volume of about 100 to 1000 ml, and a carbonation level of at least about 1 to 4 volumes in less than 120 seconds, e.g., about 60 seconds, and using pressures under 80 psi.

Figure 4:
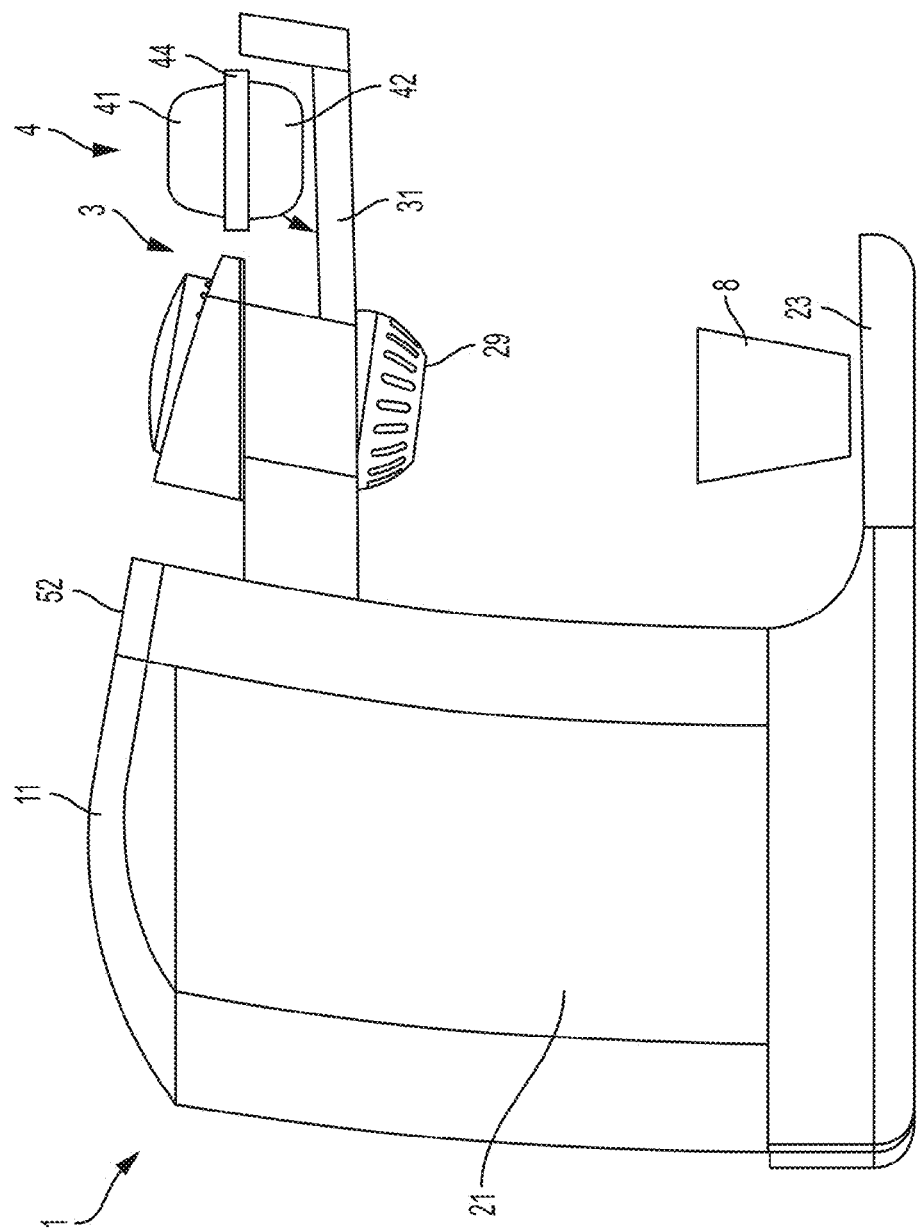
FIG. 4 shows a side view of a beverage forming machine in an illustrative embodiment.

FIG. 4 shows an illustrative embodiment of a beverage making machine 1 that can employ a cartridge in accordance with one or more aspects of the invention. In this embodiment, components of the beverage making machine 1 are located in or on a housing 21 which includes a drip tray 23 to support a user's cup or other container 8 and a reservoir 11 to provide water (a precursor liquid) to make a beverage. In this case, the reservoir 11 is optionally removable from the housing 21 and contains beverage precursor liquid that is used to form a beverage dispensed at a dispensing station 29 into the user's container 8. The reservoir 11 includes a removable lid that can be removed to provide precursor liquid into the reservoir 11, but such a lid is not required. Moreover, the reservoir 11 need not be removable and/or may be replaced by a plumbed connection to a mains water source. The beverage precursor liquid can be any suitable liquid, including water (e.g., flavored or otherwise treated water, such as sweetened, filtered, deionized, softened, carbonated, etc.), or any other suitable liquid used to form a beverage, such as milk, juice, coffee, tea, etc. (whether heated or cooled relative to room temperature or not). The reservoir 11 is part of a beverage precursor supply which provides the precursor liquid for conditioning of some kind, e.g., carbonation, filtering, chilling, mixing with a beverage medium, etc., and subsequent dispensing as a beverage.

A cartridge 4 containing a gas source and/or a beverage medium may be associated with a cartridge holder 3 of the machine 1. The gas source may emit carbon dioxide or other gas which is used by the machine 1 to carbonate the precursor liquid, and a beverage medium, such as a flavoring agent, may be mixed with precursor liquid. In this embodiment, the cartridge 4 may be associated with the cartridge holder 3 by pulling a sliding drawer 31 forwardly to expose a cartridge receiver or receiving area of the drawer 31. The cartridge 4, which in this case includes an upper compartment or chamber 41 containing a gas source 2 and a lower compartment or chamber 42 containing a beverage medium, may be placed in the cartridge receiving area of the drawer 31 and the drawer 31 closed by sliding to the left in FIG. 4. Thereafter, a user may interact with an interface 52, such as a touch screen, button or other device by which the user can cause the machine 1 to make a beverage. In response, the cartridge 4 may be clamped at a rim or band 44 located between the upper and lower compartments 41, 42 by the cartridge holder 3 and the compartments 41, 42 accessed to form the beverage. As is discussed in more detail below, aspects of the invention relate to a cartridge holder's ability to hold the upper and lower compartments 41, 42 of the cartridge 4 in spaces having different pressures (e.g., the upper compartment 41 may be held in a more highly pressurized space to receive carbonating gas than the lower compartment 42) and/or the holder's ability to pierce an inlet of the lower compartment 42 at an underside of the rim or band 44 to access the beverage medium (e.g., by injecting pressurized air or other gas into the lower compartment 42, thereby forcing the beverage medium to exit the cartridge and be dispensed at the dispense station 29). Since the cartridge 4 may be replaceable, a user may exchange the cartridge 4 to make different beverages, such as carbonated water only, a carbonated and flavored beverage, a still and flavored beverage, etc.

Figure 5:
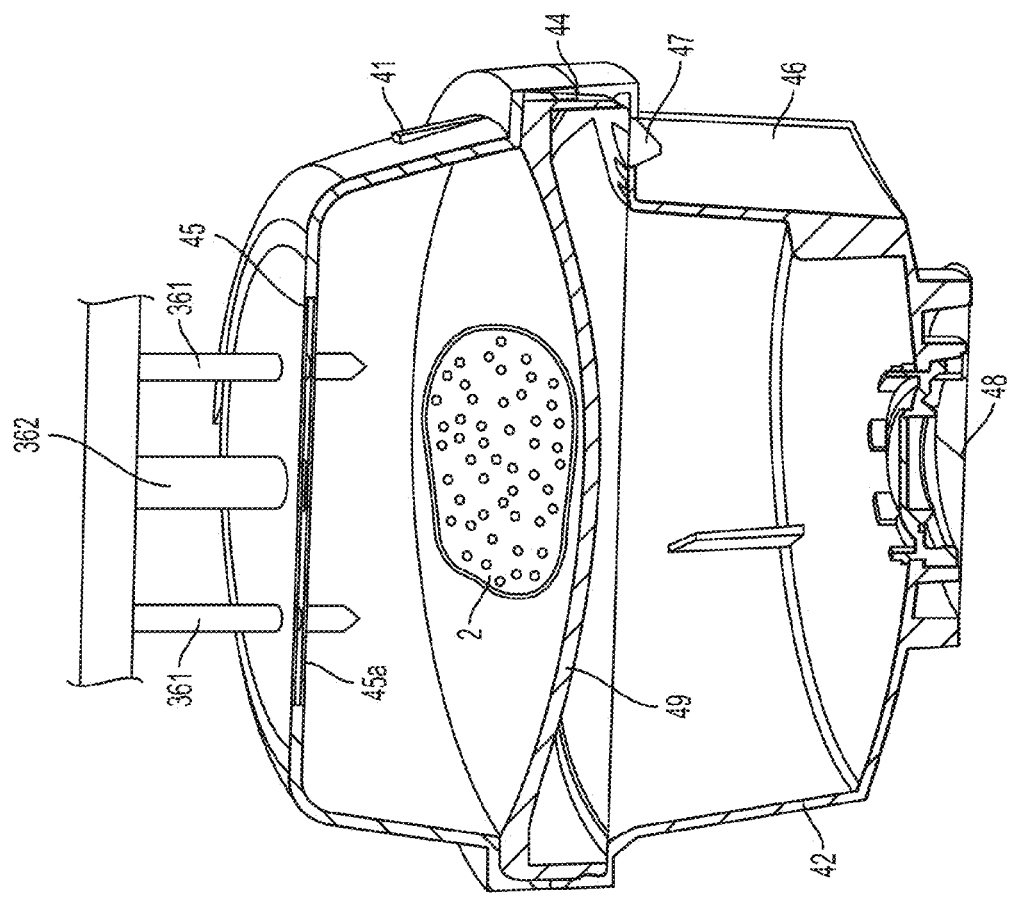
FIG. 5 shows the cross sectional view of the FIG. 1 cartridge with piercing elements engaged at the lid of the cartridge.

FIG. 5 shows an illustrative embodiment for accessing the upper compartment 41 of the cartridge 4 when the cartridge 4 is held in the cartridge holder 3 of the beverage making machine 1. In this arrangement, one or more piercing elements 361 may pierce the lid 45 to introduce activating fluid into the upper compartment 41, and a piercing element 362 may pierce the lid 45 to allow gas emitted by the gas source to exit the cartridge 4. Though not necessary, the piercing elements 361 are arranged to penetrate through the lid 45 and the filter 45a so that activating fluid can be introduced below the filter 45a. However, the piercing element 362 is arranged to pierce only the lid 45, but not the filter 45a. In this way, gas emitted in the upper compartment 41 by the gas source material 2 must pass through the filter 45a before exiting to the carbonating gas supply. This may help prevent gas source material, such as zeolite particles, from exiting the cartridge 4 and passing to the precursor liquid or portions of the machine 1. A variety of arrangements are possible for the filter 45a, such as a piece of filter paper mentioned above, a hydrophobic non-woven material that permits gas to pass, but resists liquid passage, or other element that permits gas to exit the cartridge 4, but resists movement of gas source material and/or liquid. In addition or alternately to the filter 45a, a conduit that receives the carbonating gas may include a filter element, such as a filter plug in the conduit, to help further resist movement of gas source materials from the cartridge 4. The piercing elements, may include a hollow needle, spike, blade, knife or other arrangement, to form a suitable opening in the cartridge 4. In this embodiment, the piercing elements 361 include tubular elements with an activating fluid discharge opening at a distal end such that activating fluid can be released from the piercing elements 361 below the filter 45a. In contrast, the piercing element 362 is relatively dull so as to penetrate the lid 45, but not the filter 45a. Alternately, the cartridge 4 may have defined openings, e.g., one or more ports, that include a septum or other valve-type element that permits flow into and/or out of the cartridge 4.

Figure 6:
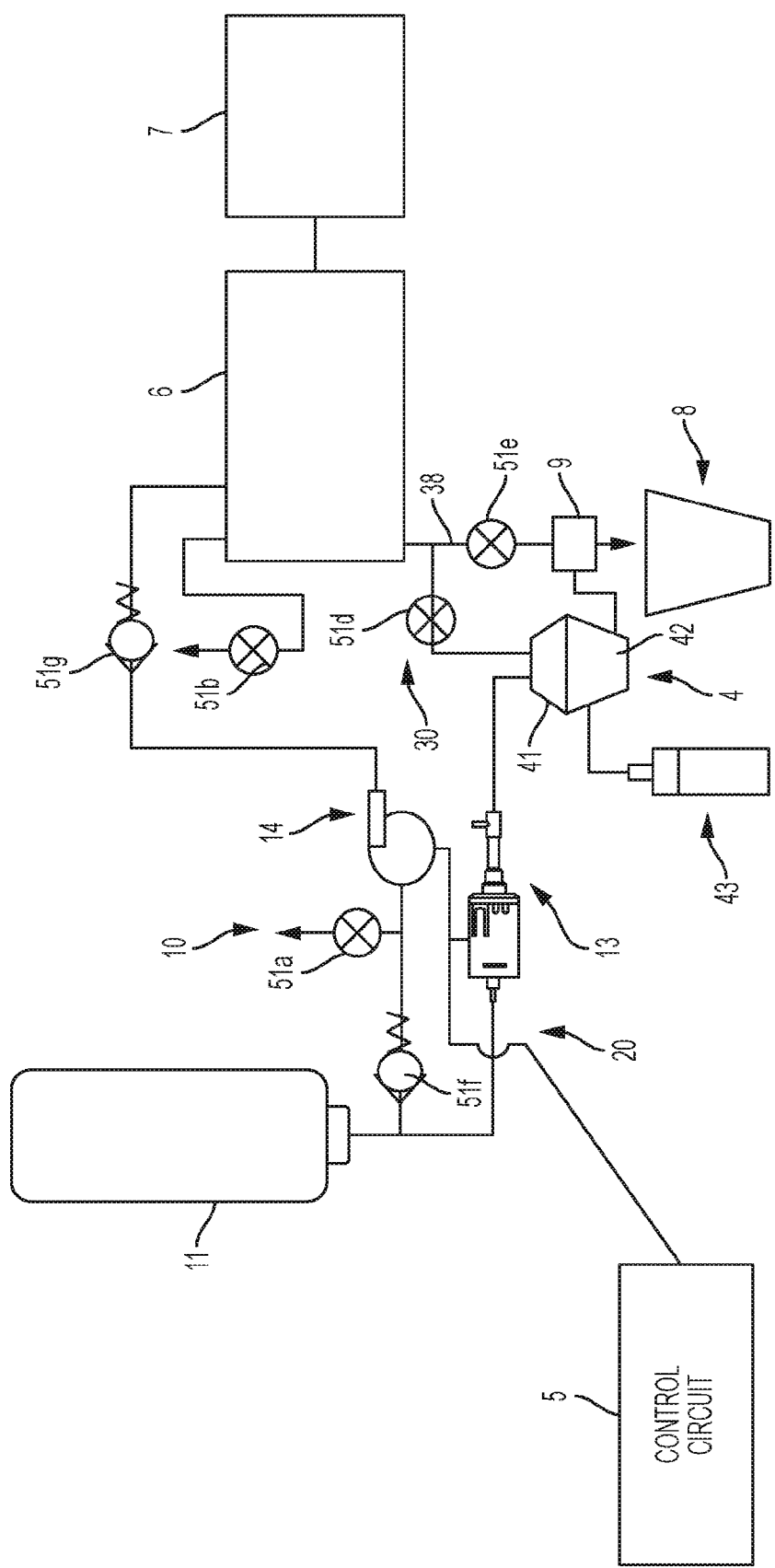
FIG. 6 shows a schematic diagram of components of a beverage forming system in an illustrative embodiment.

While a beverage making machine 1 may employ different liquid and gas flow path arrangements, FIG. 6 shows one such arrangement that may be used in the beverage making machine 1. In this embodiment, precursor liquid provided by a precursor liquid supply 10 originates in the reservoir 11, which may be removable from the machine 1, e.g., to allow for easier filling, or may be fixed in place. Although in this embodiment a user initially provides the beverage precursor liquid in the reservoir 11, the precursor supply 10 may include other components to provide liquid to the reservoir 11, such as a plumbed water line, controllable valve, and liquid level sensor to automatically fill the reservoir 11 to a desired level, a second water reservoir or other tank that is fluidly connected to the reservoir 11, and other arrangements. Liquid is delivered by a pump 14 to the carbonation tank 6 via a check valve 51f upstream of the pump 14 and a check valve 51g downstream of the pump 14. The check valves 51f, 51g may help prevent backflow from the carbonation tank 6, e.g., when the tank 6 is relatively highly pressurized during the carbonating process. In this instance, the pump 14 is a diaphragm pump, but other pump types are possible. The carbonation tank 6 may be suitably filled with liquid using any suitable control method, such as by sensing a level in the tank 6 using a conductive probe, pressure sensor, optical sensor or other sensor. A tank vent valve 51b may be opened during filling to allow the pressure in the tank 6 to vent, or may remain closed during filling, e.g., to allow a pressure build up in the tank 6. An activating fluid supply 20 which includes a pump 13 is arranged to provide activating fluid to the upper compartment of the cartridge 4, i.e., to cause the gas source material 2 to release gas to the carbonation tank 6. Gas emitted by the cartridge 4 is routed to the tank 6 via a valve 51d. A control circuit 5 may control operation of the valves 51, e.g., the valves 51 may include electromechanical or other actuators, as well as include sensors to detect various characteristics, such as temperature in the tank 6, pressure in the tank 6, a flow rate of gas or liquid in any of the system flow lines, etc.

To form a beverage, a user may associate a cartridge 4 with the machine 1, e.g., by loading the cartridge 4 into a cartridge holder 3 in a way like that discussed with respect to FIG. 4. Of course, a cartridge may be associated with the machine 1 in other ways, such as by screwing a portion of the cartridge into engagement with the machine 1, etc. With the cartridge 4 associated with the machine 1, the control circuit 5 may then activate the machine 1 to deliver liquid to the cartridge 4, e.g., to cause carbon dioxide to be generated. (Though this embodiment uses a cartridge with a gas source activated by a fluid, other arrangements are possible.) The control circuit 5 may start operation of the machine 1 in an automated way, e.g., based on detecting the presence of a cartridge 4 in the holder 3, detecting liquid in the carbonation tank 6 and closure of the holder 3, and/or other characteristics of the machine 1. Alternately, the control circuit 5 may start system operation in response to a user interacting with an interface 52, e.g., pressing a start button or otherwise providing input (e.g., by voice activation) to start beverage preparation.

To initiate carbonation after the tank is provided with a suitable amount of precursor liquid, the vent valve 51b may be closed and the pump 13 controlled to pump liquid into the upper compartment 41 of a cartridge 4 that contains a gas source 2. That is, the machine 1 may include a carbon dioxide activating fluid supply 20 that provides a fluid, e.g., in a controlled volume, at a controlled rate or otherwise to control a gas production rate, to a cartridge 4 so as to activate a carbon dioxide source in the upper compartment 41 to release carbon dioxide gas. In this embodiment, the carbon dioxide source includes a charged adsorbent or molecular sieve, e.g., a zeolite material that has adsorbed some amount of carbon dioxide gas that is released in the presence of water, whether in vapor or liquid form. Other arrangements or additions are possible for the carbon dioxide activating fluid supply 20, such as a dedicated liquid supply for the cartridge 4 that is separate from the precursor liquid supply, a pressure-reducing element in the conduit, a flow-restrictor in the conduit, a flow meter to indicate an amount and/or flow rate of fluid into the cartridge 4, a syringe, piston pump or other positive displacement device that can meter desired amounts of liquid (whether water, citric acid or other material) to the cartridge 4, and others. In another embodiment, the activating fluid supply 20 may include a gravity fed liquid supply that has a controllable delivery rate, e.g., like the drip-type liquid supply systems used with intravenous lines for providing liquids to hospital patients, or may spray atomized water or other liquid to provide a water vapor or other gas phase activating fluid to the cartridge 4.

A carbon dioxide gas supply 30 may be arranged to provide carbon dioxide gas from the cartridge 4 to an area where the gas is used to carbonate the liquid, in this case, the carbonation tank 6. The gas supply 30 may be arranged in any suitable way, and in this illustrative embodiment includes a conduit that is fluidly connected between the cartridge 4 and a carbonated liquid outlet of the carbonation tank 6. A gas control valve 51$d$ is controllable by the control circuit 5 to open and close the flow path through the gas supply conduit. (Note that in some embodiments, the valve 51$d$ may be a check valve that is not controllable by the control circuit 5.) In accordance with an aspect of the invention, the carbonation gas is delivered via a carbonating gas supply line that is fluidly coupled to the dispense line of the carbonation tank so as to deliver carbon dioxide gas to the outlet of the carbonation tank to carbonate the precursor liquid. This arrangement may provide advantages, such as introducing the carbonating gas at a relatively low point in the tank, which may help increase contact of the gas with the precursor liquid, thereby enhancing dissolution of the gas. In addition, the flow of carbonating gas through at least a portion of the dispense line 38 may help purge the dispense line 38 of liquid, helping to re-carbonate the liquid, if necessary. The gas conduit may be connected to the dispense line 38 close to the dispense valve 51$e$ so as to purge as much liquid from the dispense line 38 as possible.

The gas supply 30 may include other components than a conduit and valve, such as pressure regulators, safety valves, additional control valves, a compressor or pump (e.g., to increase a pressure of the gas), an accumulator (e.g., to help maintain a relatively constant gas pressure and/or store gas), and so on. (The use of an accumulator or similar gas storage device may obviate the need to control the rate of gas output by a cartridge. Instead, the gas source may be permitted to emit gas in an uncontrolled manner, with the emitted gas being stored in an accumulator for later delivery and use in producing a sparkling beverage. Gas released from the accumulator could be released in a controlled manner, e.g., at a controlled pressure and/or flow rate.) Also, carbonation of the precursor liquid may occur via one or more mechanisms or processes, and thus is not limited to one particular process. For example, while delivery of carbon dioxide gas to the outlet of the carbonation tank 6 may function to help dissolve carbon dioxide in the liquid, other system components may further aid in the carbonation process. In some embodiments, a sparger may be used to introduce gas into the carbonation tank, precursor liquid may be circulated in the tank, and/or other techniques may be used to alter a rate at which carbonating gas is dissolved.

Before, during and/or after carbonation of the liquid in the carbonation tank 6, a cooling system 7 may chill the liquid. The cooling system 7 may operate in any suitable way, e.g., may include ice, refrigeration coils or other cooling elements in thermal contact with the carbonation tank 6. In addition, the carbonation tank 6 may include a mixer or other agitator to move the liquid in the tank 6 to enhance gas dissolution and/or cooling. Operation in forming a beverage may continue for a preset amount of time, or based on other conditions, such as a detected level of carbonation, a drop in gas production by the cartridge 4, or other parameters. During operation, the amount of liquid provided to the cartridge 4 may be controlled to control gas output by the cartridge 4. Control of the liquid provided to the cartridge 4 may be made based on a timing sequence (e.g., the pump may be operated for a period of time, followed by stoppage for a period, and so on), based on detected pressure (e.g., liquid supply may be stopped when the pressure in the tank 6 exceeds a threshold, and resume when the pressure falls below the threshold or another value), based on a volume of activating liquid delivered to the holder 3 (e.g., a specific volume of liquid may be delivered to the cartridge 4 in one or more discrete volumes), or other arrangements.

With the precursor liquid in the carbonation tank 6 ready for dispensing, the vent valve 51$b$ may be opened to reduce the pressure in the carbonation tank 6 to an ambient pressure. As is known in the art, depressurizing the carbonation tank prior to dispensing may aid in maintaining a desired carbonation level of the liquid during dispensing. With the tank 6 vented, the vent valve 51$b$ may be closed and a pump vent valve 51$a$ may be opened. The pump 14 may then be operated to draw air or other gas into the inlet side of the pump 14 and pump the gas into the carbonation tank 6 so as to force the precursor liquid in the tank 6 to flow into the dispense line 38. That is, the arrangement of FIG. 6 incorporates another aspect of the invention in that a single pump may be used to both deliver precursor liquid to a carbonation tank or other carbonation location as well as deliver pressurized gas (air) to the carbonation tank to dispense carbonated liquid from the tank. This feature, optionally combined with the feature of using the same pump to deliver activating fluid to a gas source, may make for a simplified system with fewer components. While the pump 14 delivers air to the carbonation tank, the dispense valve 51$e$ is opened and the gas valve 51$d$ is closed during liquid dispensing. The dispensed liquid may enter a mixing chamber 9 at which the carbonated liquid and beverage medium provided from the lower compartment 42 of the cartridge 4 are combined. The beverage medium may be moved out of the cartridge 4 and to the mixing chamber 9 by introducing pressurized gas into the lower compartment 42, e.g., by way of an air pump 43. Other arrangements are possible, however, such as routing gas from the upper compartment 41 under pressure to the lower compartment 42.

The beverage medium may include any suitable beverage making materials (beverage medium), such as concentrated syrups, ground coffee or liquid coffee extract, tea leaves, dry herbal tea, powdered beverage concentrate, dried fruit extract or powder, natural and/or artificial flavors or colors, acids, aromas, viscosity modifiers, clouding agents, antioxidants, powdered or liquid concentrated bouillon or other soup, powdered or liquid medicinal materials (such as powdered vitamins, minerals, bioactive ingredients, drugs or other pharmaceuticals, nutriceuticals, etc.), powdered or liquid milk or other creamers, sweeteners, thickeners, and so on. (As used herein, "mixing" of a liquid with a beverage medium includes a variety of mechanisms, such as the dissolving of substances in the beverage medium in the liquid, the extraction of substances from the beverage medium, and/or the liquid otherwise receiving some material from the beverage medium.)

The control circuit 5 may use one or more sensors to control a carbonation level of the precursor liquid, a temperature to which the liquid is chilled (if at all), a time at which and during which beverage medium is delivered to the mixing chamber 9, a rate at which carbonating gas is produced and delivered to the tank 6, and/or other aspects of the beverage making process. For example, a temperature sensor may detect the temperature of the precursor liquid in the carbonation tank 6. This information may be used to control system operation, e.g., warmer precursor liquid temperatures may cause the control circuit 5 to increase an amount of time allowed for carbon dioxide gas to be dissolved in the precursor liquid. In other arrangements, the temperature of the precursor liquid may be used to determine whether the machine 1 will be operated to carbonate the liquid or not. For example, in some arrangements, the user may be required to add suitably cold liquid (and/or ice) to the reservoir 11 before the machine 1 will operate. (As discussed above, relatively warm precursor liquid temperatures may cause the liquid to be insufficiently carbonated in some conditions.) In another embodiment, a pressure sensor may be used to detect a pressure in the carbonation tank 6. This information may be used to determine whether the carbonation tank 6 is properly or improperly filled, if a pressure leak is present, if carbonation is complete and/or to determine whether sufficient carbon dioxide gas is being produced by the cartridge 4. For example, low detected pressure may indicate that more carbon dioxide needs to be generated, and thus cause the control circuit 5 to allow more liquid to be delivered by the activating fluid supply 20 to the cartridge 4. Likewise, high pressures may cause the flow of liquid from the activating fluid supply 20 to be slowed or stopped. Thus, the control circuit 5 can control the gas pressure in the carbonation tank 6 and/or other areas of the machine 1 by controlling an amount of liquid delivered to the cartridge 4. Alternately, low pressure may indicate that there is a leak in the system and cause the system to indicate an error is present. In some embodiments, measured pressure may indicate that carbonation is complete. For example, pressure in the tank 6 may initially be detected to be at a high level, e.g,. around 70-80 psi, and later be detected to be at a low level, e.g., around 40 psi due to gas being dissolved in the liquid. The low pressure detection may indicate that carbonation is complete. A sensor could also detect the presence of a cartridge 4 in the cartridge holder 3, e.g., via RFID tag, optical recognition, physical sensing, etc. If no cartridge 4 is detected, or if the control circuit 5 detects that the cartridge 4 is spent, the control circuit 5 may prompt the user to insert a new or different cartridge 4. For example, in some embodiments, a single cartridge 4 may be used to carbonate multiple volumes of precursor liquid. The control circuit 5 may keep track of the number of times that the cartridge 4 has been used, and once a limit has been reached (e.g., 10 drinks), prompt the user to replace the cartridge. Other parameters may be detected by a sensor, such as a carbonation level of the precursor liquid (which may be used to control the carbonation process), the presence of a suitable vessel to receive a beverage discharged from the machine 1 (e.g., to prevent beverage from being spilled), the presence of water or other precursor liquid in the carbonation tank 6 or elsewhere in the precursor supply 10, a flow rate of liquid in the pump 13 or associated conduit, the presence of a headspace in the carbonation tank 6 (e.g., if no headspace is desired, a valve may be activated to discharge the headspace gas, or if only carbon dioxide is desired to be in the headspace, a snifting valve may be activated to discharge air in the headspace and replace the air with carbon dioxide), and so on.

The control circuit 5 may also be arranged to allow a user to define a level of carbonation (i.e., amount of dissolved gas in the beverage, whether carbon dioxide or other). For example, the control circuit 5 may include a touch screen display or other user interface 52 that allows the user to define a desired carbonation level, such as by allowing the user to select a carbonation volume level of 1, 2, 3, 4 or 5, or selecting one of a low, medium or high carbonation level. Cartridges used by the machine 1 may include sufficient gas source material to make the highest level of carbonation selectable, but the control circuit 5 may control the system to dissolve an amount of gas in the beverage that is consistent with the selected level. For example, while all cartridges may be arranged for use in creating a "high" carbonation beverage, the control circuit 5 may operate the machine 1 to use less of the available gas (or cause the gas source to emit less gas than possible) in carbonating the beverage. Carbonation levels may be controlled based on a detected carbonation level by a sensor, a detected pressure in the carbonation tank 6 or elsewhere, an amount of gas output by the cartridge 4, or other features.

In another embodiment, the cartridge 4 may include indicia readably by the controller, e.g., an RFID tag, barcode, alphanumeric string, etc., that indicates a carbonation level to be used for the beverage. After determining the carbonation level from the cartridge 4, the control circuit 5 may control the machine 1 accordingly. Thus, a user need not select the carbonation level by interacting with the machine 1, but rather a carbonation level may be automatically adjusted based on the beverage selected. In yet another embodiment, a user may be able to select a gas source cartridge 4 that matches a carbonation level the user desires. (Different carbonation levels may be provided in the different cartridges by having different amounts of gas source in the cartridge 4.) For example, cartridges providing low, medium and high carbonation levels may be provided for selection by a user, and the user may pick the cartridge that matches the desired carbonation level, and provide the selected cartridge to the machine 1. Thus, a gas source cartridge labeled "low" may be chosen and used with the system to create a low level carbonated beverage.

A user may alternately be permitted to define characteristics of a beverage to be made by interacting in some way with a cartridge 4 to be used by the machine 1. For example, a tab, notch or other physical feature of the cartridge may be altered or formed by the user to signify a desired beverage characteristic. For example, a broken tab, slider indicator, a covered or uncovered perforation on a portion of the cartridge, etc., that is created by the user may indicate a desired carbonation level, an amount of beverage medium to use in forming the beverage (where the machine 1 is controllable to use less than all of the beverage medium in the cartridge to form a beverage), and so on. Features in the cartridge 4 may also be used by the control circuit 5 to detect features of the cartridge, a beverage being formed or other components of the machine 1. For example, light guides in a cartridge 4 may provide a light path to allow the controller 5 to optically detect a level of beverage medium in the cartridge 4, a flow of precursor liquid in the cartridge 4, pressure in the cartridge (e.g., where deflection of a cartridge portion can be detected and indicates a pressure), a position of a piston, valve or other cartridge component, an absence of beverage medium in the cartridge (to signify completion of beverage formation), and so on. Other sensor features may be incorporated into the cartridge, such as electrical sensor contacts (e.g., to provide conductivity measurements representative of a carbonation level or other properties of a precursor liquid), an acoustic sensor (to detect gas emission, fluid flow, or other characteristics of the cartridge), and so on.

As noted above, by arranging the gas source and/or providing activating fluid to the gas source in a controlled way, the rate at which adsorbed gas is released may be suitably controlled. This feature can make the use of some gas sources, such as a charged zeolite material, possible without requiring gas storage or high pressure components. For example, zeolites charged with carbon dioxide tend to release carbon dioxide very rapidly and in relatively large quantities (e.g., a 30 gram mass of charged zeolite can easily produce 1-2 liters of carbon dioxide gas at atmospheric pressure in a few seconds in the presence of less than 30-50 ml of water). This rapid release can in some circumstances make the use of zeolites impractical for producing relatively highly carbonated liquids, such as a carbonated water that is carbonated to a level of 2 volumes or more. That is, dissolution of carbon dioxide or other gases in liquids typically takes a certain amount of time, and the rate of dissolution can only be increased a limited amount under less than extreme conditions, such as pressures within about 150 psi of ambient and temperatures within about +/−40 to 50 degrees C. of room temperature. By controlling the rate of carbon dioxide (or other gas) production for a carbon dioxide (or other gas) source, the total time over which the carbon dioxide (or other gas) source emits carbon dioxide (or other gas) can be extended, allowing time for the carbon dioxide (gas) to be dissolved without requiring relatively high pressures. For example, when employing one illustrative embodiment incorporating one or more aspects of the invention, the inventors have produced liquids having at least up to about 3.5 volume carbonation levels in less than 60 seconds, at pressures under about 40 psi, and at temperatures around 0 degrees Celsius. This capability allows for a carbonated beverage machine to operate at relatively modest temperatures and pressures, potentially eliminating the need for relatively expensive high pressure tanks, conduits and other components, as well as extensive pressure releases, containment structures and other safety features that might otherwise be required, particularly for a machine to be used in the consumer's home. Of course, as discussed above and elsewhere herein, aspects of the invention are not limited to use with carbon dioxide, and instead any suitable gas may be dissolved in a liquid in accordance with all aspects of this disclosure.

The cartridges 4 used in various embodiments may be arranged in any suitable way, such as a relatively simple frustoconical cup-shaped container having a lid attached to the top of the container, e.g., like that in some beverage cartridges sold by Keurig, Incorporated of Reading, Mass. and shown in U.S. Pat. No. 5,840,189, for example. In one embodiment, a cartridge having a frustoconical cup-shaped container and lid may have an approximate diameter of about 30-50 mm, a height of about 30-50 mm, an internal volume of about 30-60 ml, and a burst resistance of about 80 psi (i.e., a resistance to cartridge bursting in the presence of a pressure gradient of about 80 psi from the inside to outside of the cartridge in the absence of any physical support for the cartridge). However, as used herein, a "cartridge" may take any suitable form, such as a pod (e.g., opposed layers of filter paper encapsulating a material), capsule, sachet, package, or any other arrangement. The cartridge may have a defined shape, or may have no defined shape (as is the case with some sachets or other packages made entirely of flexible material. The cartridge may be impervious to air and/or liquid, or may allow water and/or air to pass into the cartridge. The cartridge may include a filter or other arrangement, e.g., in the beverage medium cartridge 4b to help prevent some portions of the beverage medium from being provided with the formed beverage, and/or in the gas cartridge 4a to help prevent carbon dioxide source material from being introduced into the beverage or other system components.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A cartridge for use by a beverage forming machine in forming a beverage, comprising:
a container including a first chamber that is sealed and encloses a gas source material arranged to release a gas adsorbed by the gas source material with addition of a fluid introduced into the first chamber, the gas source material being a zeolite formed in solid beads in which at least 85% of the beads by weight have a size of 0.71 mm to 2.0 mm and less than 5% of the beads have a size over 2.0 mm,
wherein the container is arranged to have an inlet through which the fluid is introduced by the beverage forming machine into the first chamber to cause the gas source material to release the gas, and is arranged to have an outlet through which gas released by the gas source material exits the first chamber for dissolution in the beverage.

2. The cartridge of claim 1, wherein the gas is carbon dioxide.

3. The cartridge of claim 1, wherein less than 10% of the beads have a size under 0.71 mm.

4. The cartridge of claim 1, wherein a bead having a size less than 0.71 mm passes through a US Mesh 25 screen, a bead having a size between 0.71 mm and 2.0 mm does not pass through a US Mesh 25 screen but passes through a US Mesh 10 screen, and a bead having a size greater than 2.0 mm does not pass through a US Mesh 10 screen.

5. The cartridge of claim 1, wherein the beads each have a ratio of a mass of adsorbed gas to a mass of the bead of at least 15%, and wherein the beads are each arranged to release at least 95% of all adsorbed gas within 60 seconds when immersed in water.

6. The cartridge of claim 1, wherein the gas source material has a mass of 10-50 grams and a volume of less than 50 ml.

7. The cartridge of claim 6, wherein the gas source material has an amount of adsorbed gas equivalent to a volume of 300 ml to 2000 ml of the gas at atmospheric pressure.

8. The cartridge of claim 1, wherein the fluid is liquid water.

9. The cartridge of claim 8, wherein the gas source material is arranged to release the adsorbed gas upon the introduction of 20 ml to 40 ml of liquid water to the first chamber.

10. The cartridge of claim 1, wherein the container includes a lid that is piercable by the beverage forming machine to form the inlet and outlet.

11. The cartridge of claim 10, further comprising a filter in the first chamber that resists exit of gas source material from the outlet of the first chamber.

12. The cartridge of claim 1, wherein the container includes a top which is piercable to form the inlet and outlet of the first chamber, a sidewall that extends downwardly from the top, and a rim that extends outwardly from a lower end of the sidewall.

13. The cartridge of claim 1, wherein the container further includes a second chamber that is separated from the first chamber, the second chamber being sealed and containing a beverage medium for mixing with a precursor liquid to form the beverage.

14. The cartridge of claim 13, wherein the second chamber is located below the first chamber, and the first and second chambers are separated by a wall.

15. The cartridge of claim 13, wherein the container includes a top, an upper sidewall that extends downwardly from the top, a bottom, a lower sidewall that extends upwardly from the bottom, and a rim that extends outwardly from a lower end of the upper sidewall and an upper end of the lower sidewall.

16. The cartridge of claim 15, wherein the top is piercable to form the inlet and outlet, the rim is piercable to form an inlet opening to the second chamber through which pressurized gas is received into the second chamber, and the bottom includes an outlet opening through which beverage medium exits the second chamber.

17. The cartridge of claim 1, wherein the first chamber and the gas source material are arranged to cause release of the gas adsorbed in the gas source material within 20 to 40 seconds upon introduction of 20 to 40 ml of liquid water into the first chamber.

18. The cartridge of claim 17, wherein the gas released is equivalent to a volume of 300 ml to 2000 ml of the gas at atmospheric pressure.

19. The cartridge of claim 1, wherein the gas source material is arranged to emit gas suitable for forming a carbonated beverage having a volume of between 100-1000 ml and a carbonation level of about 1 to 5 volumes over a time period of less than 60 seconds.

* * * * *